US008851451B2

(12) United States Patent
Orino et al.

(10) Patent No.: US 8,851,451 B2
(45) Date of Patent: Oct. 7, 2014

(54) NON-RISING ELECTRIC ACTUATED VALVE OPERATOR

(75) Inventors: Christopher Orino, Salt Lake City, UT (US); Filiberto R. Jimenez, Sandy, UT (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 399 days.

(21) Appl. No.: 12/728,088

(22) Filed: Mar. 19, 2010

(65) Prior Publication Data

US 2011/0083747 A1     Apr. 14, 2011

Related U.S. Application Data

(60) Provisional application No. 61/162,384, filed on Mar. 23, 2009.

(51) Int. Cl.
| F16K 31/44 | (2006.01) |
| F16K 3/02 | (2006.01) |
| F16K 31/05 | (2006.01) |
| F16K 31/50 | (2006.01) |
| C10B 25/10 | (2006.01) |

(52) U.S. Cl.
CPC ............... *C10B 25/10* (2013.01); *F16K 3/0254* (2013.01); *F16K 31/05* (2013.01); *F16K 31/508* (2013.01)
USPC .......................... 251/267; 251/326; 137/553

(58) Field of Classification Search
CPC ..... F16K 31/508; F16K 3/0254; F16K 31/05; C10B 25/10
USPC ......... 251/267, 273–274, 268, 264, 266, 326; 137/553
See application file for complete search history.

(56) References Cited

U.S. PATENT DOCUMENTS

| 176,321 | A | 4/1876 | Kromer |
| 1,656,355 | A | 1/1928 | Huffmann |
| 1,991,621 | A | 2/1935 | Noll |
| 2,064,567 | A | 12/1936 | Riley |
| 2,245,554 | A | 6/1941 | Court |
| 2,317,566 | A | 4/1943 | Utterback |
| 2,403,608 | A | 7/1946 | Payne et al. |
| 2,562,285 | A | 7/1951 | Timmer |

(Continued)

FOREIGN PATENT DOCUMENTS

| JP | 2000145989 | 5/2000 |
| RU | 2163359 C1 | 9/1992 |

(Continued)

OTHER PUBLICATIONS

J. J. Kelley, "Applied Artificial Intelligence for Delayed Coking", Hydrocarbon Processing, Nov. 2000, 144-A-144-J, Gulf Publishing Company, USA.

(Continued)

*Primary Examiner* — John K Fristoe, Jr.
*Assistant Examiner* — David Colon Morales
(74) *Attorney, Agent, or Firm* — Michael F. Krieger; Kirton McConkie

(57) ABSTRACT

The present invention features a coke drum de-heading system. The de-header valve is equipped with a valve body, a gate, a transmission system and an actuator. Actuation of the valve closure functions to open and close the de-header valve.

46 Claims, 10 Drawing Sheets

(56) References Cited

U.S. PATENT DOCUMENTS

| | | | |
|---|---|---|---|
| 2,717,865 A | 9/1955 | Kimberlin, Jr. et al. | |
| 2,734,715 A | 2/1956 | Knox | |
| 2,757,896 A * | 8/1956 | Sangster | 251/176 |
| 2,761,160 A | 9/1956 | Manning | |
| 2,950,897 A | 8/1960 | Bryant | |
| 3,150,534 A * | 9/1964 | Harrison | 74/409 |
| 3,215,399 A | 11/1965 | McInerney et al. | |
| 3,367,625 A | 2/1968 | Fortune | |
| 3,379,623 A | 4/1968 | Forsyth | |
| 3,617,480 A | 11/1971 | Keel | |
| 3,646,947 A | 3/1972 | Rochelle et al. | |
| 3,716,310 A | 2/1973 | Guenther | |
| 3,837,356 A | 9/1974 | Selep et al. | |
| 3,852,047 A | 12/1974 | Schlinger et al. | |
| 4,125,438 A | 11/1978 | Kelly et al. | |
| 4,162,058 A * | 7/1979 | Ellis | 251/326 |
| 4,174,728 A | 11/1979 | Usnick et al. | |
| 4,253,487 A | 3/1981 | Worley et al. | |
| 4,275,842 A | 6/1981 | Purton et al. | |
| 4,335,733 A | 6/1982 | Richards | |
| 4,346,728 A * | 8/1982 | Sulzer | 137/243.6 |
| 4,376,524 A * | 3/1983 | Shelton | 251/86 |
| 4,410,398 A | 10/1983 | Chipman et al. | |
| RE31,439 E | 11/1983 | Rosensweig | |
| 4,492,103 A | 1/1985 | Naumann | |
| 4,531,539 A | 7/1985 | Jandrasi et al. | |
| 4,541,608 A * | 9/1985 | Forester et al. | 251/77 |
| 4,569,503 A * | 2/1986 | Karr, Jr. | 251/14 |
| 4,611,613 A | 9/1986 | Kaplan | |
| 4,626,320 A | 12/1986 | Alworth et al. | |
| 4,651,973 A * | 3/1987 | Oliver | 251/267 |
| 4,666,585 A | 5/1987 | Figgins et al. | |
| 4,726,109 A | 2/1988 | Malsbury et al. | |
| 4,738,399 A | 4/1988 | Adams | |
| 4,771,805 A | 9/1988 | Maa | |
| 4,797,197 A | 1/1989 | Mallari | |
| 4,824,016 A | 4/1989 | Cody et al. | |
| 4,877,488 A | 10/1989 | Cody et al. | |
| 4,923,021 A | 5/1990 | Courmier et al. | |
| 4,929,339 A | 5/1990 | Elliot, Jr. et al. | |
| 4,960,358 A | 10/1990 | Digiacomo et al. | |
| 4,973,386 A | 11/1990 | Callegari et al. | |
| 4,993,264 A | 2/1991 | Cody et al. | |
| 5,004,152 A | 4/1991 | Baker et al. | |
| 5,022,266 A | 6/1991 | Cody et al. | |
| 5,022,268 A | 6/1991 | Wolf et al. | |
| 5,024,730 A | 6/1991 | Colvert | |
| 5,035,221 A | 7/1991 | Martin | |
| 5,041,207 A | 8/1991 | Harrington et al. | |
| 5,048,876 A | 9/1991 | Wallskog | |
| 5,059,331 A | 10/1991 | Goyal | |
| 5,107,873 A | 4/1992 | Clinger | |
| 5,116,022 A | 5/1992 | Genreith et al. | |
| 5,221,019 A | 6/1993 | Pechacek et al. | |
| 5,228,525 A | 7/1993 | Denney et al. | |
| 5,228,825 A | 7/1993 | Fruchtbaum et al. | |
| 5,299,841 A | 4/1994 | Schaefer | |
| 5,417,811 A | 5/1995 | Malsbury | |
| 5,464,035 A | 11/1995 | Heinecke | |
| 5,509,446 A * | 4/1996 | Bey | 137/625.32 |
| 5,581,864 A | 12/1996 | Rabet | |
| 5,633,462 A | 5/1997 | Heaslip et al. | |
| 5,652,145 A | 7/1997 | Cody et al. | |
| 5,755,427 A * | 5/1998 | Koskinas | 251/188 |
| 5,785,843 A | 7/1998 | Antalffy et al. | |
| 5,800,680 A | 9/1998 | Guerra | |
| 5,816,505 A | 10/1998 | Tran et al. | |
| 5,816,787 A | 10/1998 | Brinkerhoff et al. | |
| 5,876,568 A | 3/1999 | Kindersley | |
| 5,907,491 A | 5/1999 | Canada et al. | |
| 5,927,684 A | 7/1999 | Marx et al. | |
| 5,947,674 A | 9/1999 | Malsbury et al. | |
| 5,974,887 A | 11/1999 | Cody et al. | |
| 5,984,260 A * | 11/1999 | Rawson et al. | 251/71 |
| 6,007,068 A | 12/1999 | Dellacorte | |
| 6,039,844 A | 3/2000 | Malik | |
| 6,066,237 A | 5/2000 | Kindersley | |
| 6,073,505 A * | 6/2000 | Yuda | 74/89.36 |
| 6,113,745 A | 9/2000 | Maitland et al. | |
| 6,117,308 A | 9/2000 | Ganji | |
| 6,223,925 B1 | 5/2001 | Malsbury et al. | |
| 6,228,225 B1 | 5/2001 | Meher-Homji | |
| 6,254,733 B1 | 7/2001 | Lu et al. | |
| 6,264,797 B1 | 7/2001 | Schroeder et al. | |
| 6,264,829 B1 | 7/2001 | Antalffy et al. | |
| 6,349,858 B1 * | 2/2002 | Kingsford et al. | 222/400.7 |
| 6,367,843 B1 | 4/2002 | Fetzer | |
| 6,539,805 B2 | 4/2003 | Heaslip et al. | |
| 6,547,250 B1 | 4/2003 | Noble et al. | |
| 6,565,714 B2 | 5/2003 | Lah | |
| 6,644,436 B2 | 11/2003 | Hofmann et al. | |
| 6,644,567 B1 | 11/2003 | Adams et al. | |
| 6,660,131 B2 | 12/2003 | Lah | |
| 6,738,697 B2 | 5/2004 | Breed | |
| 6,751,852 B2 | 6/2004 | Malsbury et al. | |
| 6,843,889 B2 | 1/2005 | Lah | |
| 6,926,807 B2 | 8/2005 | Bosi et al. | |
| 6,964,727 B2 | 11/2005 | Lah | |
| 6,989,081 B2 | 1/2006 | Lah | |
| 7,033,460 B2 | 4/2006 | Lah | |
| 7,037,408 B2 | 5/2006 | Wilborn et al. | |
| 7,115,190 B2 | 10/2006 | Lah | |
| 7,117,959 B2 | 10/2006 | Lah | |
| 7,124,774 B2 * | 10/2006 | Weingarten | 137/514.7 |
| 7,316,762 B2 | 1/2008 | Lah | |
| 2002/0134658 A1 | 9/2002 | Lah | |
| 2002/0157897 A1 | 10/2002 | Hofmann et al. | |
| 2002/0166862 A1 | 11/2002 | Malsbury et al. | |
| 2002/0170814 A1 | 11/2002 | Lah | |
| 2003/0047153 A1 | 3/2003 | Kubel et al. | |
| 2003/0089589 A1 | 5/2003 | Malsbury | |
| 2003/0127314 A1 | 7/2003 | Bell et al. | |
| 2003/0159737 A1 | 8/2003 | Stares | |
| 2003/0185718 A1 | 10/2003 | Sellakumar | |
| 2004/0118746 A1 | 6/2004 | Wilborn et al. | |
| 2004/0154913 A1 | 8/2004 | Lah | |
| 2008/0236313 A1 * | 10/2008 | Hodnefjell et al. | 74/89.29 |
| 2009/0056507 A1 * | 3/2009 | Eschborn et al. | 81/128 |

FOREIGN PATENT DOCUMENTS

| | | |
|---|---|---|
| RU | 2043604 | 10/1995 |
| SU | 558524 A | 11/1973 |
| SU | 558524 | 5/1977 |
| SU | 959413 A | 12/1980 |
| SU | 959413 | 9/1982 |
| WO | 0015985 | 3/2000 |

OTHER PUBLICATIONS

Claudio Allevato & Richard S. Boswell, "Assessing the Structural Integrity and Remaining Life of Coke Drums with Acoustic Emission Testing, Stain Gaging, and Finite Element Analysis," ETCE 99—Symposium on Plant and Facilities Reliability and Mechanical Integrity, 1999 Engineering Source Technology Conference & Exhibition, Stress Engineering Services, Inc.

Paul J. Ellis & Christopher A. Paul, "Tutorial: Delayed Coking Fundamentals," AIChE 1998 Spring National Meeting's International Conference on Refinery Processes Topical Conference Preprints 1998, 1998, Great Lakes Carbon Corporation.

U.S. Appl. No. 10/731,874, Non-Final Rejection issued Feb. 23, 2005 by the United States Patent and Trademark Office. pp. 1-10.

U.S. Appl. No. 10/731,874, Final Rejection issued Jun. 28, 2005 by the United States Patent and Trademark Office. pp. 1-7.

U.S. Appl. No. 10/731,874, Examiner's search and strategy results issued Sep. 26, 2005. 1 page.

U.S. Appl. No. 10/731,874, Notice of Allowance of Fees Due, Issue Information, Index of Claims and Search information issued Sep. 29, 2005 by the United States Patent and Trademark Office; 7 pages.

U.S. Appl. No. 10/731,874, Notice of Allowance of Fees Dues, List of References, Issue Information, Search information and index of claims issued Jan. 18, 2006 by the United States Patent and Trademark Office; 10 pages.

(56) References Cited

OTHER PUBLICATIONS

U.S. Appl. No. 10/731,874, Non-Final Rejection issued Oct. 13, 2006 by the United States Patent and Trademark Office; 22 pages.
U.S. Appl. No. 10/731,874, Non-Final Rejection issued Apr. 6, 2007 by the United States Patent and Trademark Office; 14 pages.
U.S. Appl. No. 10/731,874, Requirement for Restriction/Election, List of References and index of claims issued Sep. 6, 2007 by the United States Patent and Trademark Office; 20 pages.
U.S. Appl. No. 10/731,874, Examiner's search strategy and results issued Dec. 5, 2007; 1 page.
U.S. Appl. No. 10/731,874, Non-Final Rejection issued Dec. 11, 2007 by the United States Patent and Trademark Office; 22 pages.
U.S. Appl. No. 10/997,834, Examiner's search strategy and results issued Jun. 22, 2005; 5 pages.
U.S. Appl. No. 10/997,834, Non-Final Rejection issued Jul. 6, 2005 by the United States Patent and Trademark Office; 44 pages.
U.S. Appl. No. 10/997,834, Examiner's search strategy and results issued Sep. 26, 2005; 1 page.
U.S. Appl. No. 10/997,834, Notice of Allowance and Fees, Issue Information, Index of Claims and search information issued Sep. 29, 2009 by the United States Patent and Trademark Office; 8 pages.
U.S. Appl. No. 10/411,849, Examiner's search strategy and results issued Aug. 4, 2005; 5 pages.
U.S. Appl. No. 10/411,849, Non-Final Rejection issued Aug. 9, 2005 by the United States Patent and Trademark Office; 8 pages.
U.S. Appl. No. 10/411,849, Non-Final Rejection issued Feb. 8, 2006 by the United States Patent and Trademark Office; 7 pages.
U.S. Appl. No. 10/411,849, Examiner's search strategy and results issued Jul. 18, 2006; 1 page.
U.S. Appl. No. 10/411,849, Notice of Allowance and Fees Due, Examiner Interview Summary Record, Issue Information, Index of Claims, Search Information and Bibliographic Data Sheet issued Jul. 24, 2006 by the United States Patent and Trademark Office; 14 pages.
U.S. Appl. No. 10/997,234, Examiner's search strategy and results issued Mar. 14, 2006; 3 pages.
U.S. Appl. No. 10/997,234, Non-Final Rejection issued Mar. 20, 2006 by the United States Patent and Trademark Office, 13 pages.
U.S. Appl. No. 10/997,234, Examiner's search strategy and results issued Aug. 4, 2006; 1 page.
U.S. Appl. No. 10/997,234, Notice of Allowance and Fees Due, Issue Information, Bibliographic Data Sheet, Index of Claims and Search Information issued Aug. 10, 2006 by the United States Patent and Trademark Office, 8 pages.
U.S. Appl. No. 10/412,628, Non-Final Rejection issued Feb. 16, 2007 by the United States Patent and Trademark Office; 17 pages.
U.S. Appl. No. 10/412,628, Notice of Allowance and Fees Due, Bibliographic Data Sheet, Index of Claims, Search Information and Issue Information issued Aug. 24, 2007 by the United States Patent and Trademark Office; 11 pages.
U.S. Appl. No. 10/873,022, Non-Final Rejection issued Jul. 7, 2005 by the United States Patent and Trademark Office, 12 pages.
U.S. Appl. No. 10/873,022, Notice of Allowance and Fees Due, Specification and Issue Information issued Jan. 4, 2006 by the United States Patent and Trademark Office, 9 pages.
U.S. Appl. No. 10/274,280, Examiner's search strategy and results issued Mar. 14, 2004; 2 pages.
U.S. Appl. No. 10/274,280, Non-Final Rejection issued Mar. 25, 2004 by the United States Patent and Trademark Office; 10 pages.
U.S. Appl. No. 10/274,280, Notice of Allowance and Fees Due, Issue Information and Bibliographic Data Sheet issued Oct. 5, 2004 by the United States Patent and Trademark Office; 8 pages.
U.S. Appl. No. 10/442,673, Examiner's search strategy and results issued Aug. 26, 2004, 2 pages.
U.S. Appl. No. 10/442,673, Non-Final Rejection issued Sep. 1, 2004 by the United States Patent and Trademark Office; 10 pages.
U.S. Appl. No. 10/442,673, Final Rejection issued Feb. 23, 2005 by the United States Patent and Trademark Office; 6 pages.
U.S. Appl. No. 10/442,673, Notice of Allowance and Fees Due, Amendment After Final, Issue Information, Index of Claims and Search Information issued Apr. 20, 2005 by the United States Patent and Trademark Office; 10 pages.
Norm Lieberman, "Coke Drum Foam-Overs Causes & Cures," http://www.coking.com/Foamover.htm (May 7, 2002), available at http://web.archive.org/web/20020507212053/http://www.coking.com/Foamover.htm.
U.S. Statutory Invention Registration # H1442 (Application No. 976,813), Edgerton et al. (Jun. 6, 1995).

* cited by examiner

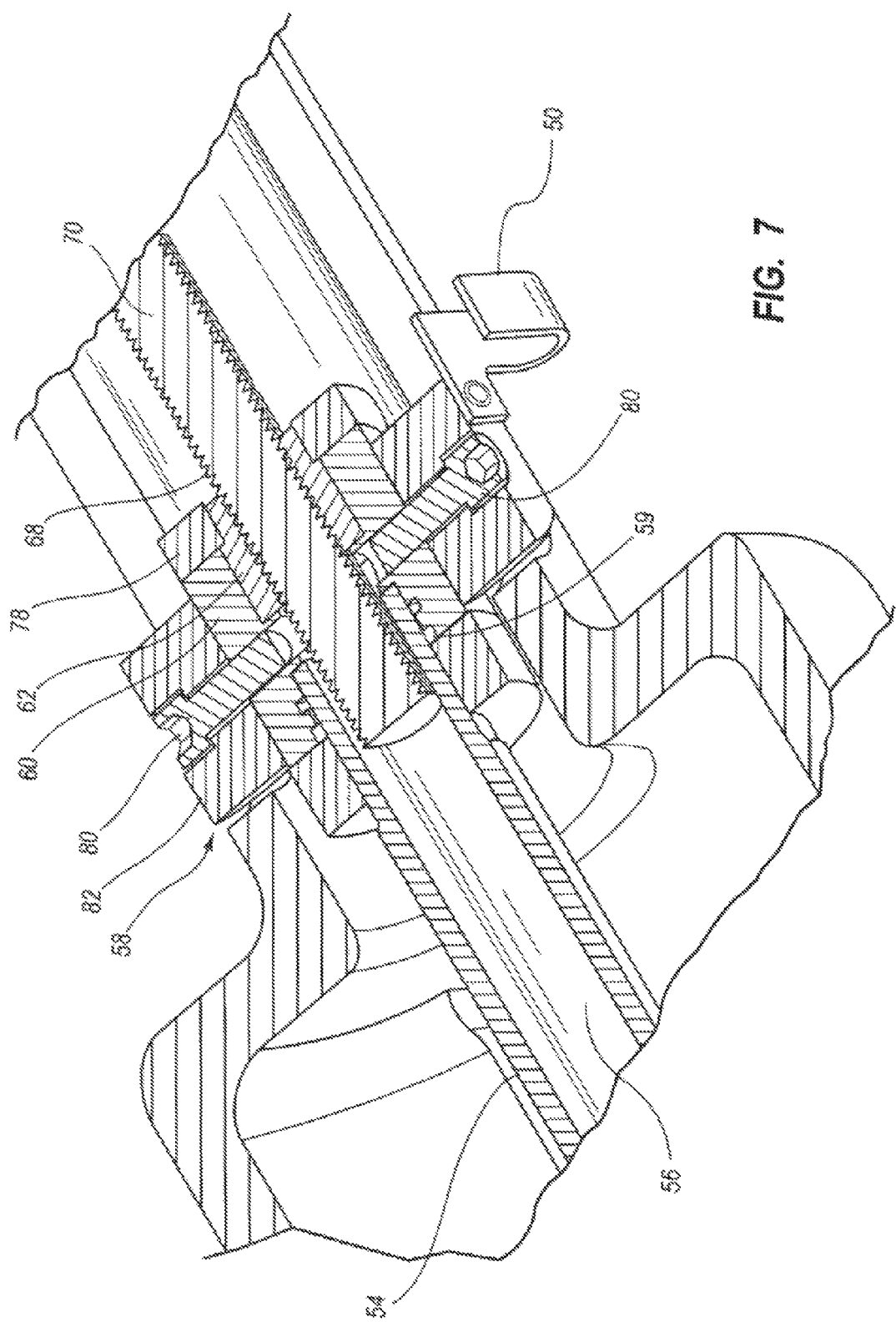

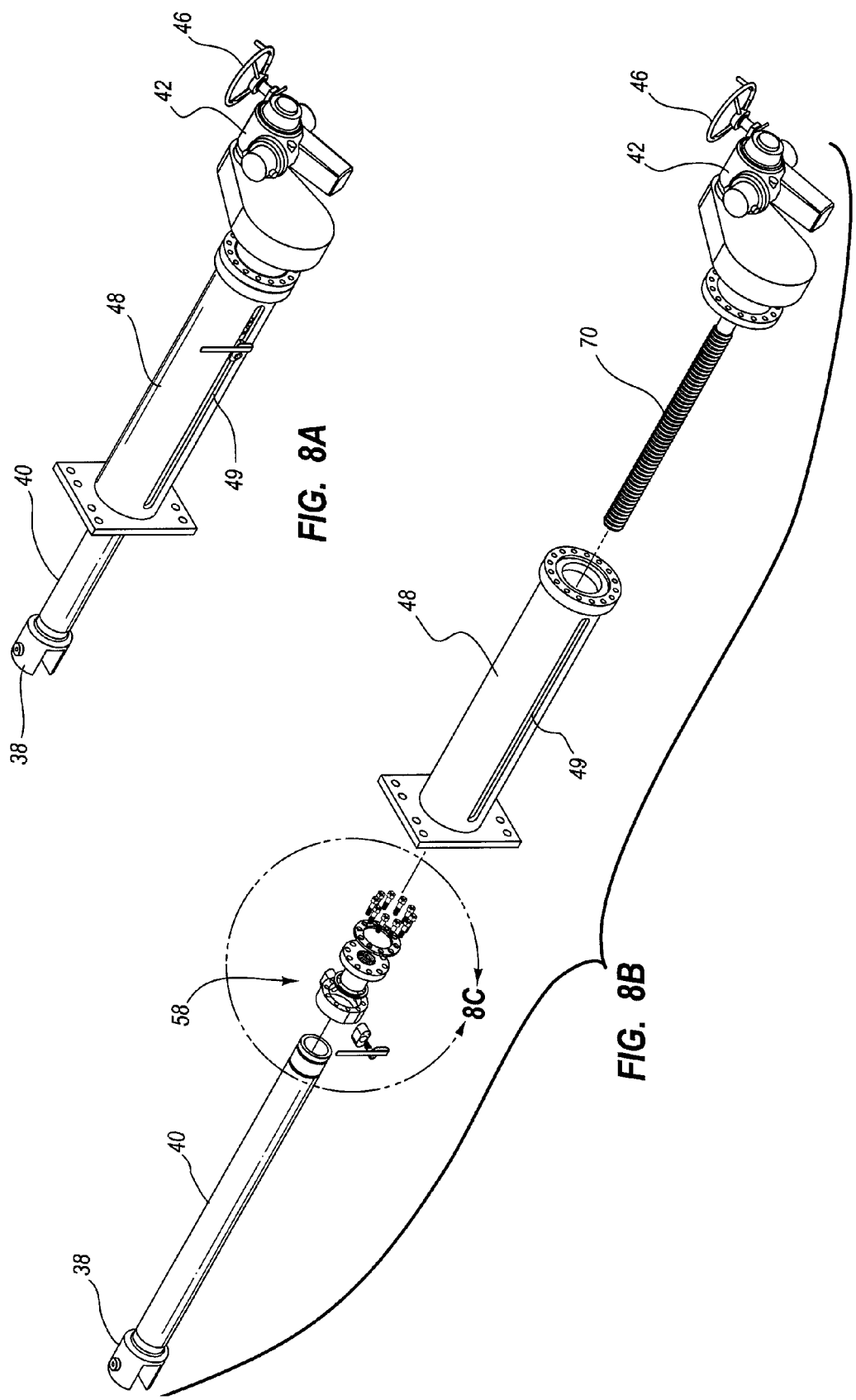

NON-RISING ELECTRIC ACTUATED VALVE OPERATOR

RELATED APPLICATIONS

This application claims priority to U.S. Provisional Patent Application No.: 61/162,384 filed Mar. 23, 2009, entitled "Non-Rising Electric Actuated Valve Operator."

BACKGROUND

1. Field of Invention

The present invention relates to the devices and systems used to open and close a valve coupled, either directly or via an intermediate spool, to a vessel, which may contain a fluid, distillate, or unconsolidated debris byproduct produced from a manufacturing process, such as the several types of coke produced from a petroleum refinery process, as well as to the several methods employed for unheading a vessel utilizing such devices or systems. Specifically, the present invention relates to a valve actuator system comprising an actuator, a gear box assembly, and a transmission assembly, the transmission assembly designed to open and close a deheading valve attached to a coke drum to facilitate the removal of coke during the decoking process.

2. Background

Electric actuators mount on valves which, in response to a signal, move the valve to a desired position using an outside power source. Various electric types of motors use AC or DC electricity to drive a combination of gears to generate the desired torque level. There are various types of electric actuators used in different industries depending on a desired application. Each type of actuator may be used with a specialized valve of choice. For example, rotary electric actuators are typically used in combination with a ball, plug, and butterfly valves. Linear electric actuators are often used with a gate, globe, diaphragm, pinch, and angle valves that feature a sliding stem that opens or closes the valve. Electric actuators often provide control and indexing capabilities to allow multiple position stops along strokes.

In the hydrocarbon processing industry, many refineries recover valuable products from the heavy residual oil that remains after refining operations are completed. This recovery process is known as delayed coking and produces valuable distillates and coke in large vessels or coke drums.

When a coke drum is full it must be emptied of the byproduct it holds in preparation for refilling the coke drum in another cycle. First, the coke drum is steam purged and cooled with quench water. The coke drum is then drained of water and vented to atmospheric pressure, after which the top and bottom flanges are removed, a process referred to as de-heading. Once the coke drum is de-headed, the coke remaining within the coke drum is removed and emptied into a catch basin. Once the coke is removed, the heads are replaced and the coke drum is prepared to repeat the cycle.

In addition to the dangers inherit in the unheading of a coke drum during the decoking process, space on the working deck around the deheader valve is limited. Various prior art devices have been utilized as deheader valves. Electric actuator systems, pneumatic actuator systems and hydraulic actuator systems have all been utilized in prior art deheader valve systems. In typical electric actuator systems, the drive stem extends beyond the electric actuator when the blind is in an open position, such that use of an electric actuator requires an additional several feet of deck space during operation. Additionally, prior art electric actuators allow tortional loads to reach the valve stem, resulting in increased wear on system elements within the valve itself. Wear within the valve necessitates expensive downtime and repair. The large amount of floor space required to accommodate these assemblies and devices that automate removal of the flange head from the coke drum is extremely undesirable and downtime of the valve is profoundly expensive for a decoker operation.

Additionally prior art electric actuators have unpredictable life spans. The pressure, load and velocity at which electric actuators most move a gate through the open and closed positions affect where on the actuator system wear will occur. Side loading, the cut of threads, dirt and other debris additionally affect prior art devices and can accelerate wear and decrease the life of the actuator. Additionally, prior art devices have failed to produce electric actuators which produce constant thrust output for a constant torque input. Accordingly, prior art actuators produce inconsistent thrust output over the lifespan of the electric actuator producing inconsistent and undesirable results. Further prior art systems utilizing electric actuators often fail to open and close quickly enough to mitigate dangerous conditions inherent in unheading a coke drum during a de-coking process. Such prior art devices are not capable of operating within the size constraints imposed by the environment at the bottom of a coke drum, are incapable of producing consistent thrust output over the lifespan of the actuator and do not allow for predictive maintenance and can produce unsafe conditions.

SUMMARY

Some embodiments of the present invention feature a coke drum de-header system comprising: a coke drum having at least one port therein, said coke drum receiving byproduct material from a manufacturing system and process; a de-header valve removably coupled to the coke drum for regulating the port of the coke drum and for allowing repeated de-heading and re-heading of the coke drum, said de-header valve comprising: a valve closure or gate, wherein the valve closure is capable of being actuated to travel between an open and closed position with respect to the orifice of the de-header valve and the port of the coke drum; a seat system structured to support the valve closure or gate; and a valve closure or gate actuator system.

Some embodiments of the present invention feature a coke drum de-heading system comprising a gear box assembly. In some embodiments of the actuating system, the gear box assembly translates input from an electric motor into torque loads. The gear box assembly may be comprised of various constitutive elements. For example, the gear box assembly may comprise an input, a planetary gear set, a manual override de-clutching gear, one or more idler gears capable of translating loads from the input to a main gear, an internal thrust bearing, and an output for communicating torque loads to an output drive.

In some embodiments, the internal thrust bearings may comprise various constitutive elements, for example, some embodiments comprise radial bearings and seats. Some embodiments of the actuating system comprise a transmission assembly for translating the tortional drive of an electric actuator into an axial load for opening and closing a deheader valve.

Some embodiments allow for simultaneous translation of torque loads into axial loads, effectively eliminating torque loads on the deheader valve or its constitutive elements, as well as utilizing a actuation linkage or combination of drill stem and rotating screw, which effectively retract into the valve stem rather than extending beyond the electric actuator into deck space.

In some embodiments, the transmission assembly comprises a housing assembly, wherein the housing assembly may comprise various constitutive elements. For example, the housing assembly may utilize a drive nut with a threaded internal surface structured to operably engage the threaded external surface of a rotating screw, where the rotating screw driven by an electric motor. In some non-limiting examples, the housing assembly, comprising a drive nut, moves axially along the length of the non-rising rotating screw. In some embodiments, with the housing assembly effectively coupled to a valve stem, the axial movement of the drive nut along the non-rising screw produces effective axial displacement of the valve stem, allowing a valve to be open, closed and throttled. Because various embodiments utilize an electric actuator, the torque and thrust applied to the various constitutive elements of the transmission assembly, and the deheader valve elements, may be precisely controlled.

As such, the coke drum de-heading system and attendant valve actuator system provide unique advantages over prior art or prior related de-heading systems, namely the de-heading of a coke drum, while maximizing deck space and decreasing wear on difficult to repair and expensive valve parts.

The present invention further features methods for de-heading a coke drum.

BRIEF DESCRIPTION OF THE DRAWINGS

The foregoing and other features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 7 discloses a close-up cutaway vie of a non-limiting example of a transmission system comprising a housing assembly, non-rising rotational screw and hollow valve stem; and FIG. 8A-8E illustrate several views of a non-limiting example of a transmission system.

DETAILED DESCRIPTION OF THE PREFERRED EMBODIMENTS

Figure 1:
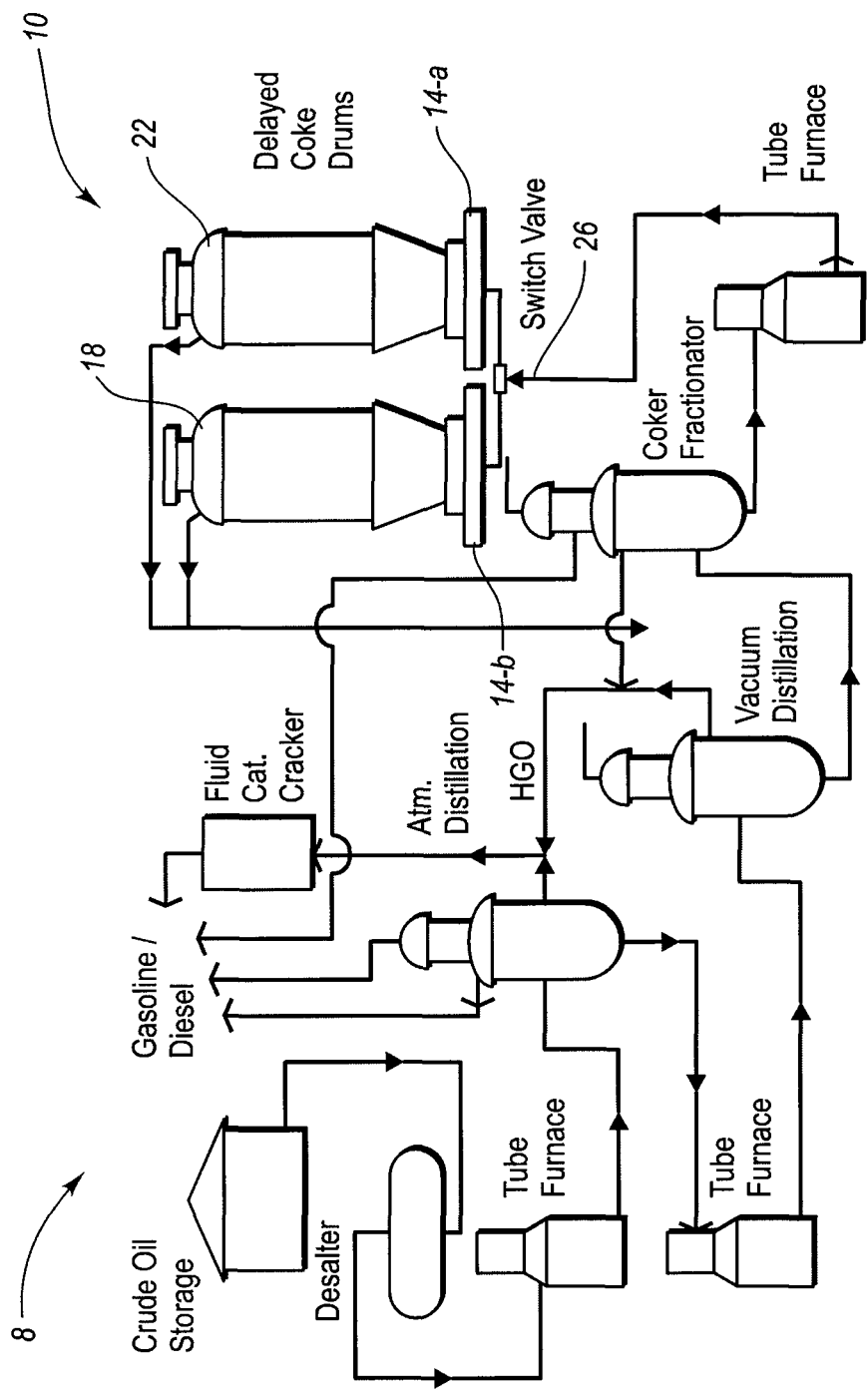
FIG. 1 illustrates, generally, an exemplary refinery process, wherein refinery byproducts are routed to a series of coke drums for the manufacture of coke, and wherein the coke drums are equipped with the de-header valves.

It will be readily understood that the components of the present invention, as generally described and illustrated in the figures herein, could be arranged and designed in a wide variety of different configurations. Thus, the following more detailed description of the embodiments of the system, device, and method of the present invention, as represented in FIGS. 1 through 8E, is not intended to limit the scope of the invention, as claimed, but is merely representative of the presently preferred embodiments of the invention.

The presently preferred embodiments of the invention will be best understood by reference to the drawings wherein like parts are designated by like numerals throughout. The following more detailed description is divided into sections. The first section pertains to and sets forth a general discussion of the delayed coking process, including the process and effects of de-heading a coke drum at the end of a coke manufacturing cycle. The second section pertains to and sets forth the coke drum de-heading system, including the variety of valves or valve-types that may be utilized in the coke drum de-heading system and within a delayed coking process, as well as the various methods for utilizing the system within a delayed coking or other similar environment. The third section pertains particularly to valve actuator and transmission systems that may be used in conjunction with various valves. It is noted that these sections are not intended to be limiting in any way, but are simply provided as convenience to the reader.

General Discussion on the Delayed Coking Process and the De-Heading of Coke Drums In the typical delayed coking process, petroleum residues are fed to one or more coke drums where they are thermally cracked into light products and a solid residue—petroleum coke. Several different physical structures of petroleum coke may be produced. To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown.

Due to the shape of the coke drum, coke accumulates in the area near and attaches to the flanges or other members used to close off the opening of the coke drum during the manufacturing process. To empty the drum, the flanges or members must first be removed or relocated. In the case of a flanged system, once full, the coke drum is vented to atmospheric pressure and the top flange is unbolted and removed to enable placement of a hydraulic coke cutting apparatus. Removing or opening the bottom flange, or valve is commonly known as "de-heading" because it removes or breaks free the head of coke that accumulates at the surface of the flange or valve. Once the flanges are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or a loading facility.

Present Invention coke Drum De-Heading Systems

Although the present invention may be utilized in association with both top and bottom de-heading systems, or rather the de-heading system independent valve actuator system of the present invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system.

The present invention describes a valve system and method for unheading or de-heading a coke drum following the manufacture of coke therein. As the present invention is especially adapted to be used in the coking process, the following discussion will relate specifically in this manufacturing area. It is foreseeable however, that the present invention may be adapted to be an integral part of other manufacturing processes producing various elements or by products other than coke, and such processes should thus be considered within the scope of this application. For example, it is contemplated that the present invention de-header system and de-header valves may be utilized within other critical service applications, such as inlet feed line isolation, blowdown isolation, fractionator isolation, and back warming.

FIG. 1 depicts, generally, a petroleum manufacturing and refinery process 8 having several elements and systems present (identified, but not discussed). In addition to these elements, petroleum manufacturing and refinery process 8 further comprises at least one coke drum and may include, as illustrated, a first and a second coke drum 18 and 22, respectively, and de-header valves 14-a and 14-b attached thereto. In typical delayed coking operations, there are at least two coke drums in simultaneous operation so as to permit the ongoing, batch continuous, manufacture and refinery of petroleum as well as its coke byproduct.

Figure 2:
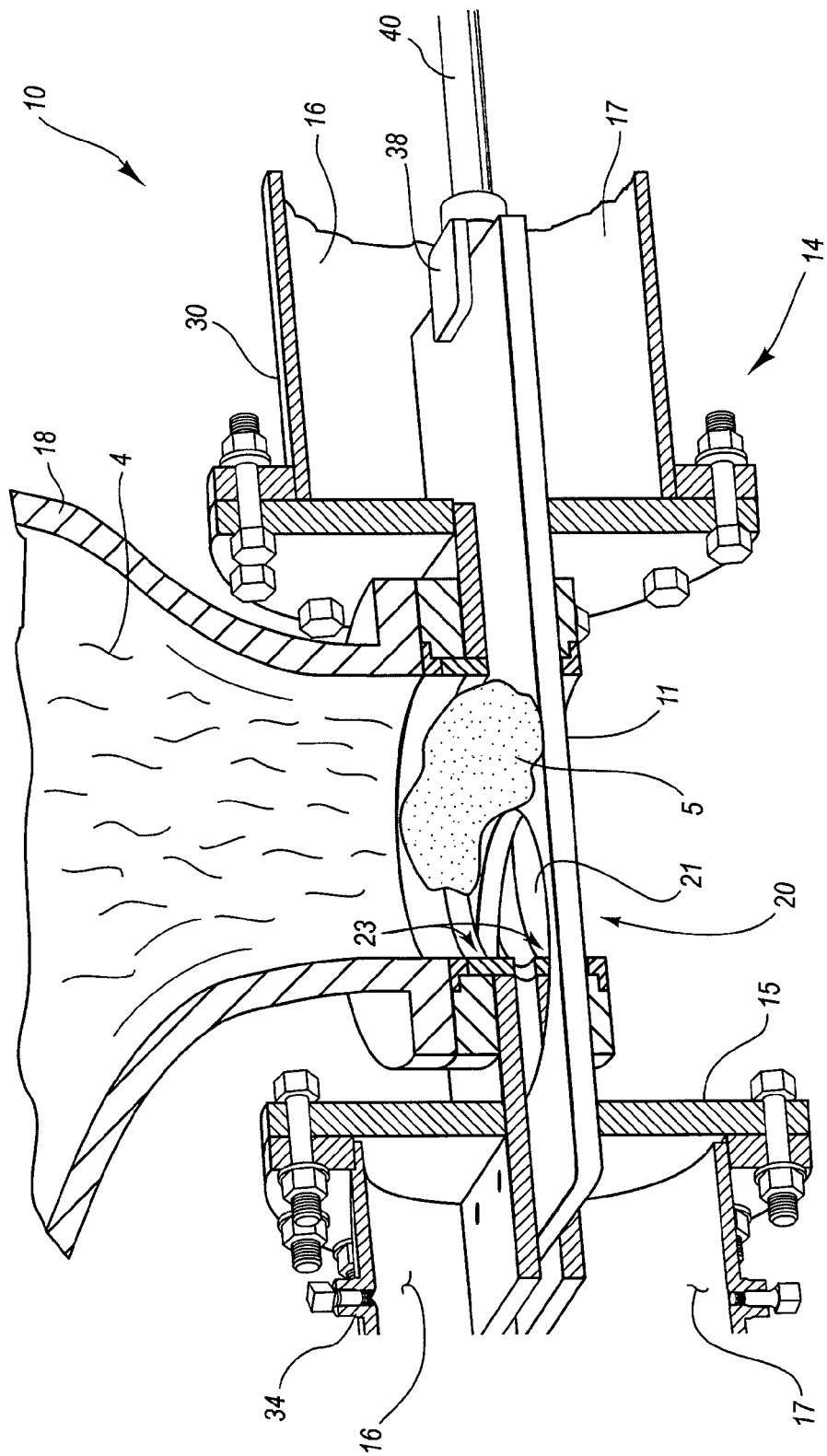
FIG. 2 illustrates a de-header valve coupled to a coke drum.

FIG. 2 illustrates a non-limiting example of a de-heading system 10. Coke drum de-heading system 10 comprises a de-header valve 14 that removably couples to a coke drum 18 using various means known in the art. De-header valve 14 typically couples to coke drum 18 or a spool at its flanged port or opening, much the same way a flanged head unit would be attached in prior related designs. De-header valve 14 is shown further attaching to upper and lower bonnets 30 and 34, respectively.

The seat system of the de-header valve is designed to cleanly break the bond between the coke and the exposed surface of the valve closure at each stroke. The total thrust required for this action combined with the thrust required to overcome seating friction and inertia is carefully calculated and is accomplished by actuating the valve closure, thus causing it to relocate or transition from a closed to an open position.

FIG. 2 illustrates a non-limiting example of a sliding blind gate-type de-header valve 14, according to one exemplary embodiment of the present invention. Sliding blind gate-type de-header valve 14 comprises a main body 15 removably coupled to upper and lower bonnets 30 and 34, each comprising upper and lower chambers 16 and 17, respectively. Main body 15 comprises an opening or port 20 therein. Main body 15 removably couples to a complimentary flange portion and associated opening or port of a coke drum 18 or a spool, such that each opening is concentric and aligned with one another.

Sliding blind gate-type de-header valve 14 further comprises a valve closure in the form of a sliding blind or gate 11. Some embodiments of a gate 11 may have an aperture therein that is capable of aligning with the opening in the coke drum and/or the opening in the spool, as well as the opening in the main body of the valve 20. Alternatively, some gates may be solid, not utilizing an aperture therein, but rather utilizing a short gate that effectively opens the valve to allow coke from a coke drum 18 to fall through a valve when the shortened gate 11 is retracted into the upper bonnet 30.

The gate 11 slides back and forth in a linear, bi-directional manner between means for supporting a valve closure, shown in this exemplary embodiment as seat support system 23. Seat support system 23 may comprise any type of seating arrangement, including dual, independent seats, wherein the seats are both static, both floating or dynamic, or a combination of these. Seat support system 23 may alternatively comprise a single seat in support of valve closure 11, wherein the seat may comprise a static or floating or dynamic seat. In another exemplary embodiment, means for supporting a valve closure may dispense with a seating system in favor of a support system built into main body 15, such that one or more portions or components of main body 15 are selected and prepared to support valve closure 11. In any event, seat support system may comprise a metal contact surface that contacts and seals with a metal surface on valve closure 11, wherein this contact seal is maintained during the coke manufacturing process.

Valve closure 11 is coupled to clevis 38, which is turn coupled to valve stem 40. Valve stem 40 may be utilized as an element of a system that functions to cause valve closure 11 to oscillate between an open and closed position. An actuator system 36 may be a hydraulically controlled power source contained within cylinder and that is capable of moving valve closure 11 through its linear, bi-directional cycle during a coking process, and may be utilized to de-head and re-head the coke drum 18. Alternatively, an actuator system 36 may be an electrically controlled power source utilizing an electric actuator 42 that is capable of moving a valve closure via a transmission system 44 through its linear, bi-directional cycle during a coking process, and may be utilized to dehead and rehead the coke drum.

Valve Actuator and Transmission Systems

Figure 3:
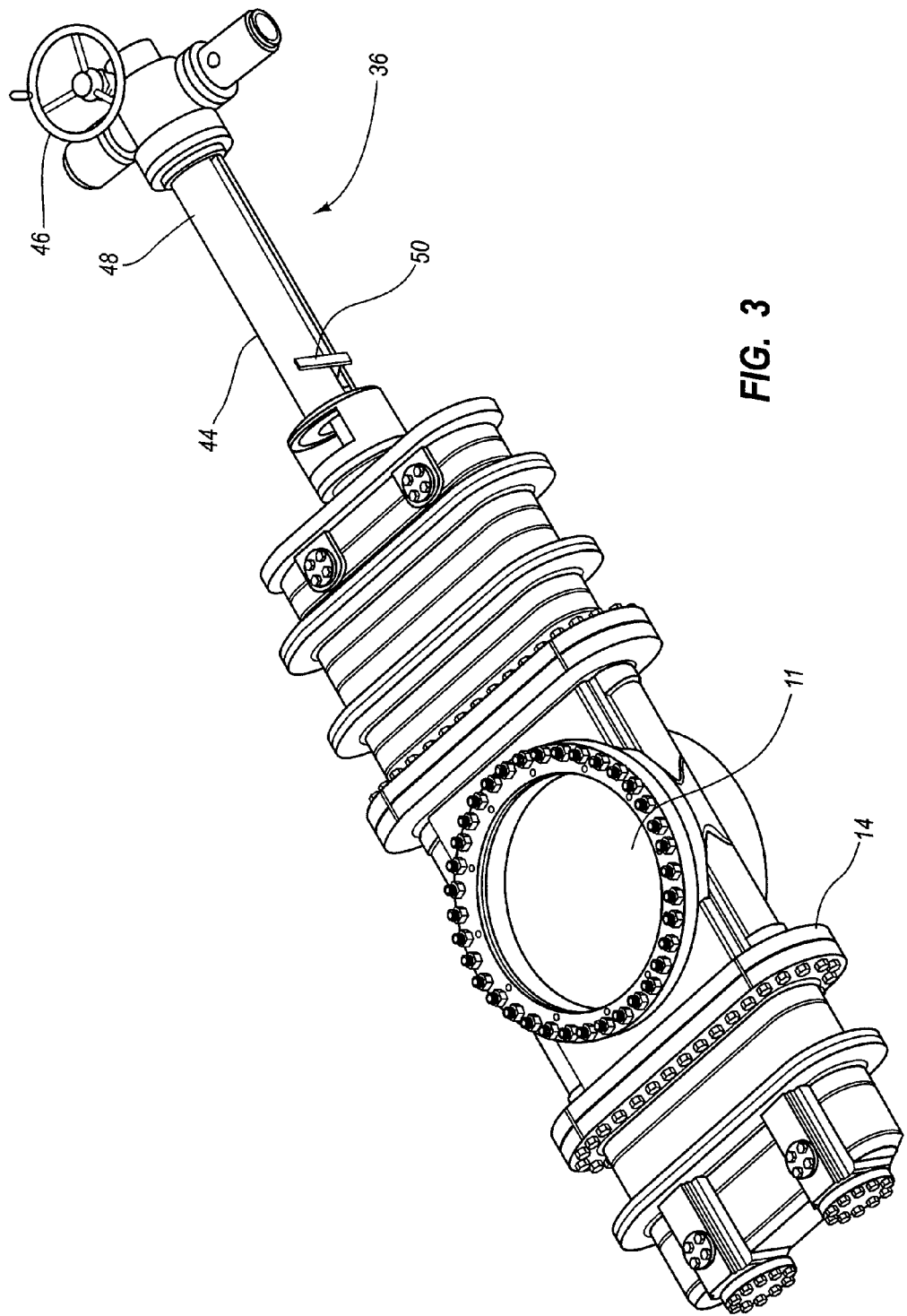
FIG. 3 illustrates a non-limiting example of a deheader valve system comprising a valve, a gate, a transmission system and an electric actuator.

FIG. 3 illustrates a deheader valve 14 and actuator system 36. The actuator system 36, as depicted, comprises a transmission system 44 and an electric actuator 42. Preferred embodiments of the transmission system may be utilized to longitudinally shift a gate 11 from a closed position, as illustrated in FIG. 3, through a partially open position, as illustrated in FIG. 2, to a fully open position, completely opening the aperture in the valve 20, such that the contents of a coke drum 18 may be allowed to be displaced through the opening in the valve 20.

Figure 4:
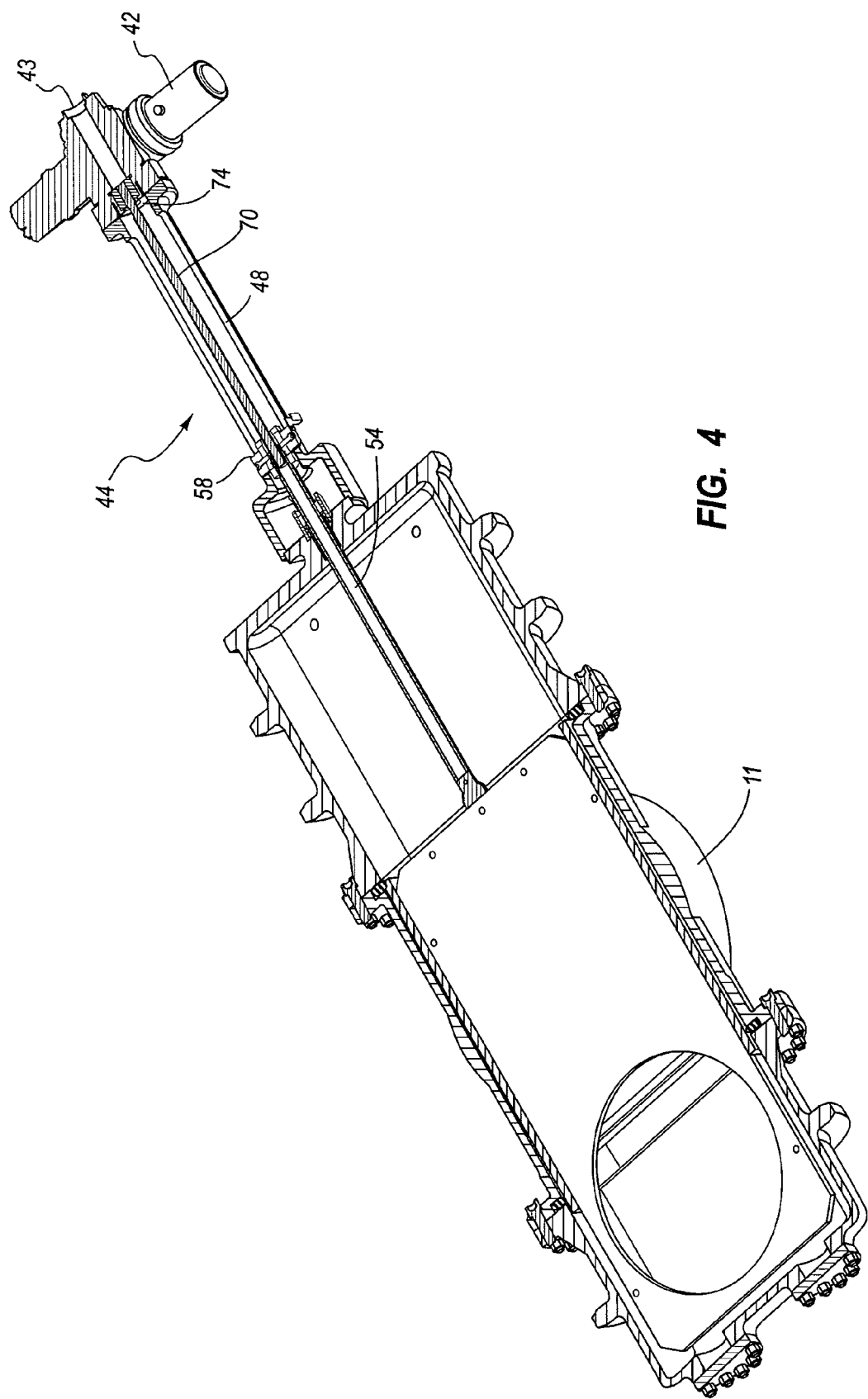
FIG. 4 illustrates a cutaway view of a non-limiting example of a deheader valve system illustrating various constitutive elements of the valve, transmission system and electric actuator.
Figure 5:
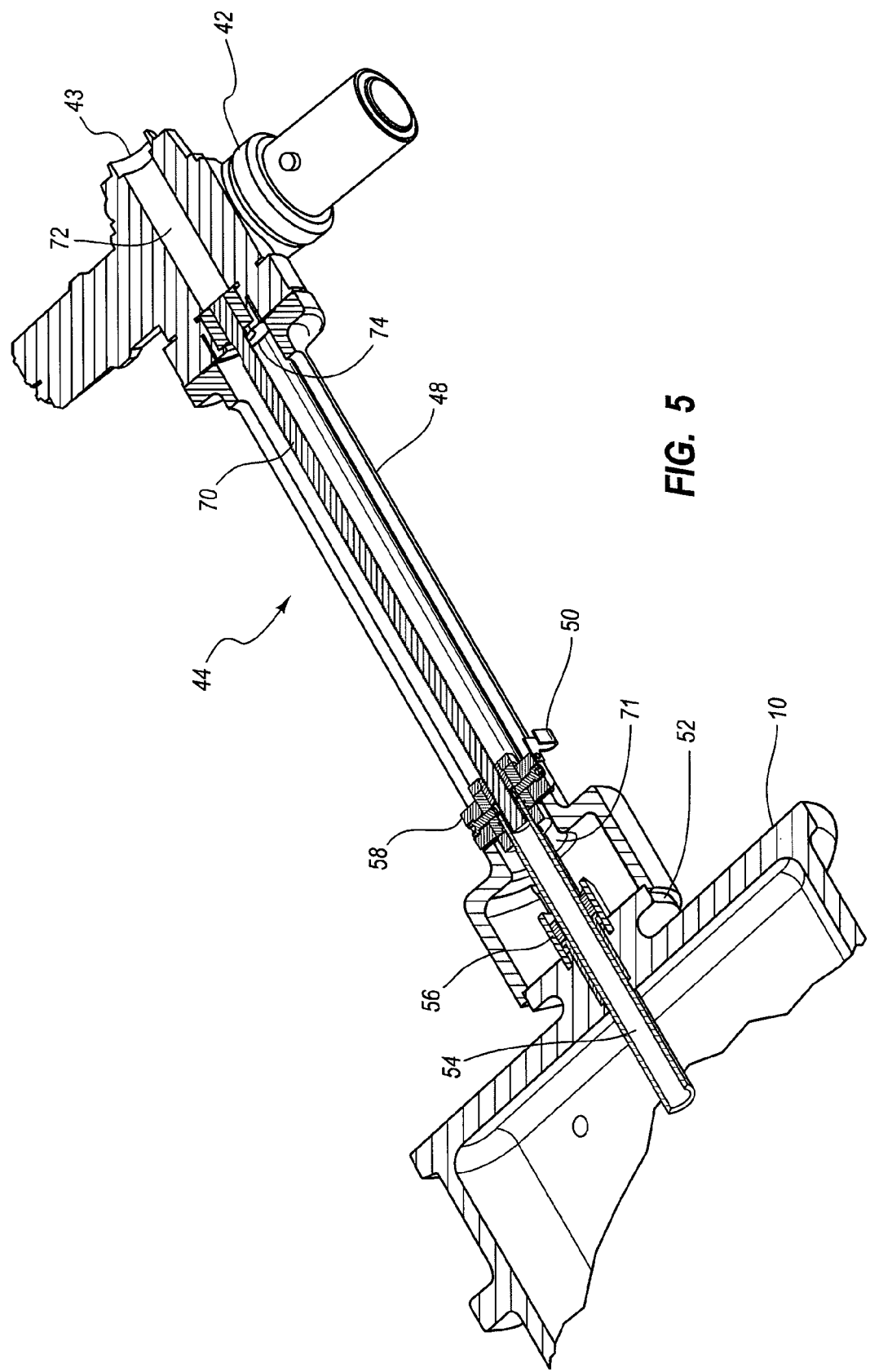
FIG. 5 illustrates a cutaway view of a non-limiting example of a transmission system, packing gland and electric actuator.

FIG. 4 provides a cutaway view of a non-limiting example of a valve 14. The gate 11, as depicted in FIG. 4, is in a closed position, the solid surfaces of the gate 11 effectively blocking the opening in the valve 20. Additionally illustrated in FIG. 5, are the mechanical arrangements between the deheader valve 14, the transmission system 44, and electric actuator 42. The transmission system 44, as depicted in FIG. 4, comprises a housing assembly 58, a support tower 48, a non-rising rotating screw 70 coupled at a first end to a hollow valve stem 54 and at a second end by a coupling system 74 to the electric actuator 42.

FIG. 5 illustrates a close-up cutaway view of a non-limiting example of an actuator 42 and transmission system 44 utilized according to some embodiments of the present invention. The depicted actuator 42 and transmission system 44 is shown as attached to a deheading system 10 and may be utilized to open and close a deheader valve effectively deheading and reheading a coke drum. In preferred embodiments, an electric actuator 42 is utilized to generate torque on a non-rising rotation screw 70. The non-rising rotation screw 70 may be coupled by various structures or coupling systems 74 to the electric actuator.

Figure 6:
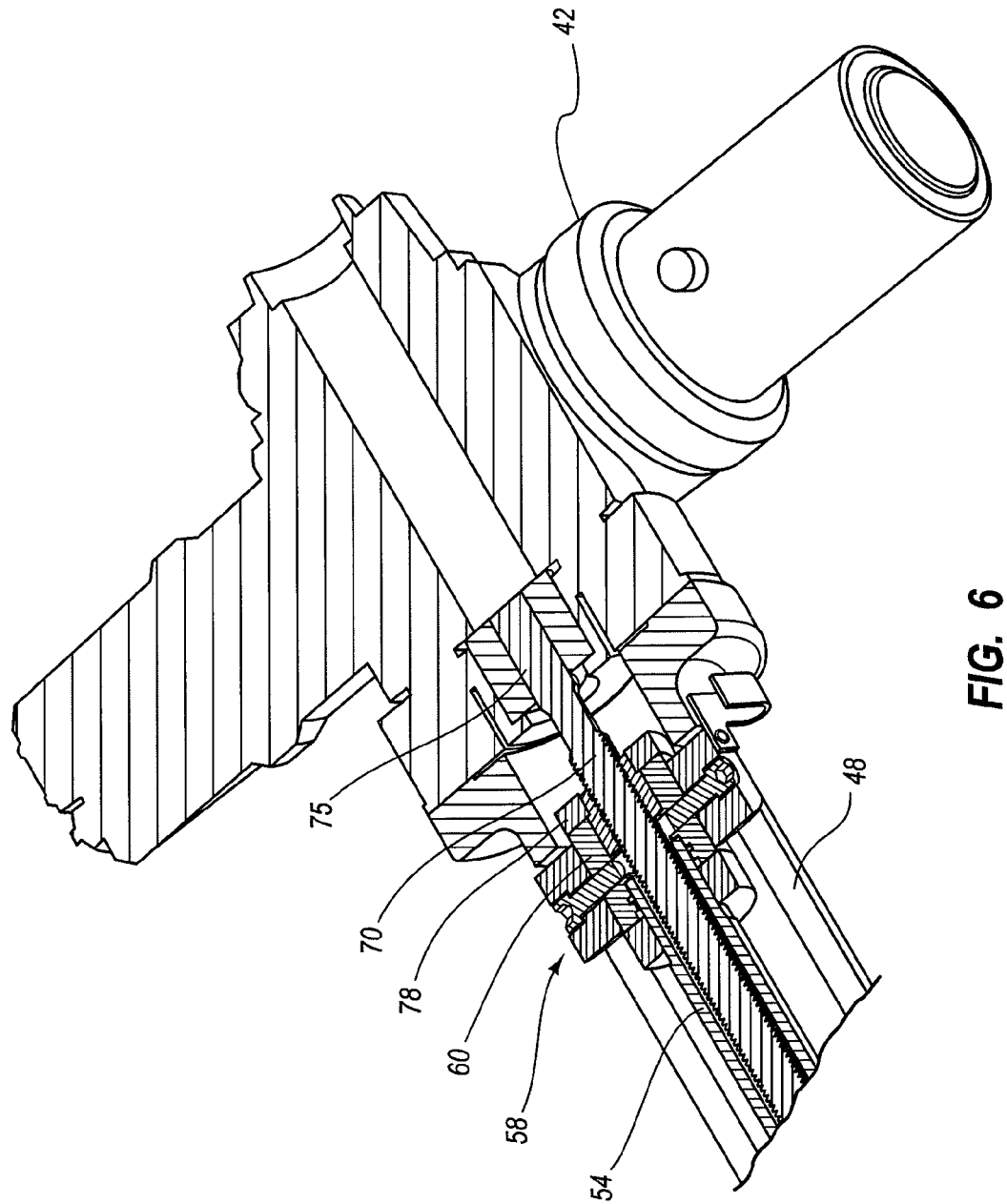
FIG. 6 illustrates a close-up cutaway view of a non-limiting example of a transmission system comprising a non-rising rotating screw, operably engaged with a housing assembly and coupled to an electric actuator.
Figure 8C:
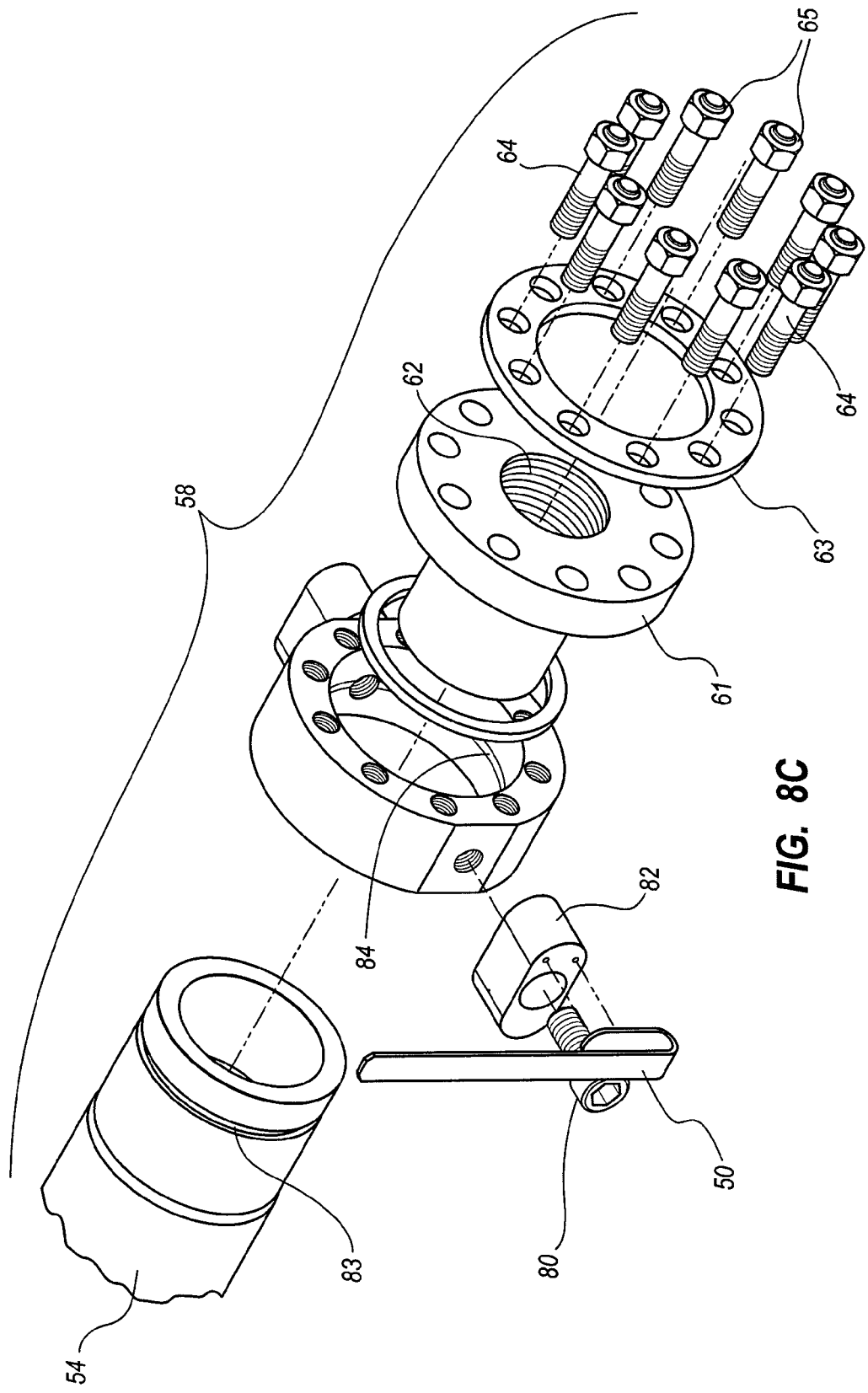
Figure 8D:
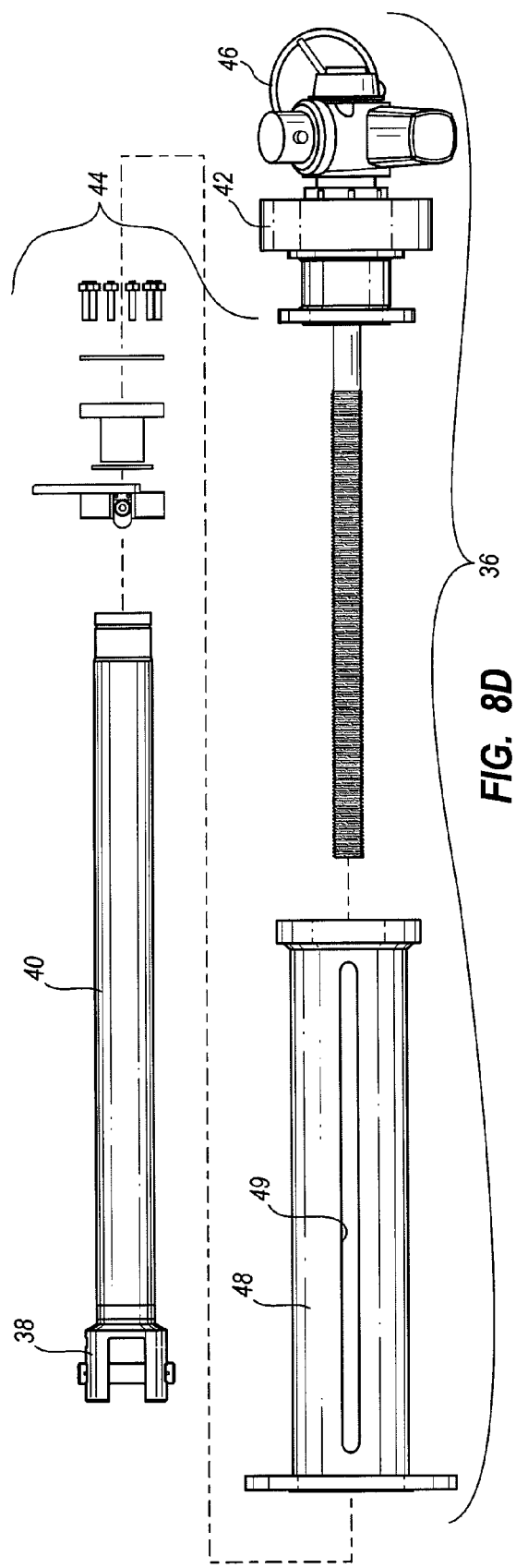
Figure 8E:
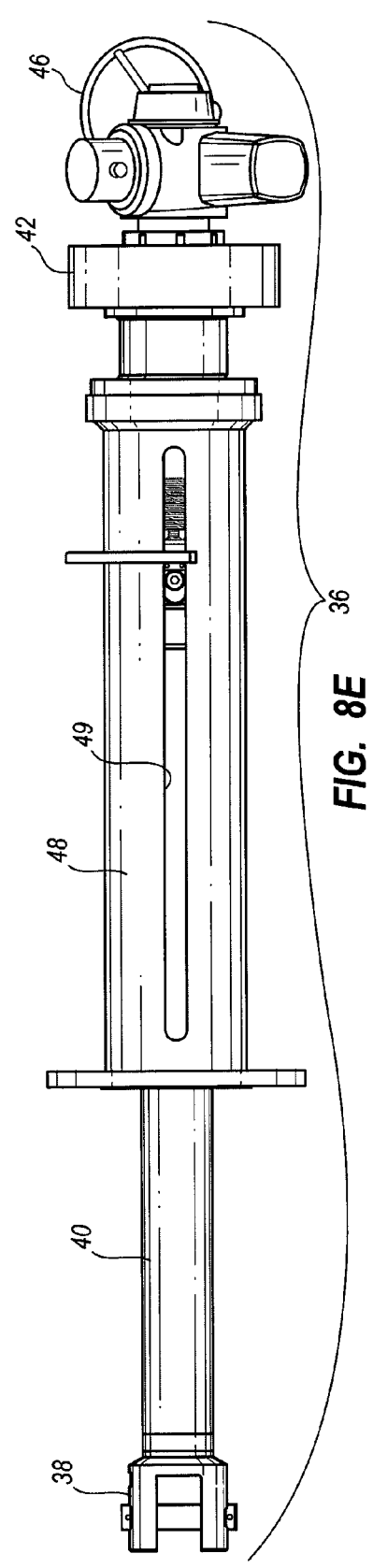

As depicted in FIG. 6, a coupling system may comprise a key or double key way slot 75 as a means for providing a shear point within the coupling system 74 between the electric actuator 42 and the non-rising rotating screw 70. In some embodiments, the non-rising rotating screw 70 rotates, but is not displaced axially. As depicted in FIG. 5, non-rising rotating screw 70 has a first end 72 and a second end 71. Without being axially displaced through the transmission system 44 the non-rising rotating screw 70 receives a torque load from the electric actuator 42 and is allowed to translate that torque load, via a transmission system 44 to a housing assembly 58. The effect of utilizing the transmission system 44 of the present invention, is to translate the torque load applied by the electric actuator 42 into the axial displacement of a blind or gate 11 in a deheader valve 14. In preferred embodiments, translation of the torque forces into the axial movement of a gate 11 is accomplished without axially displacing the first end 71 of the non-rising rotating screw 70, such that the non-rising rotating screw effectively rotates within the transmission system 44, but does not alter the axial position of the first end 71 of the non-rising rotating screw relative to its position within the electric actuator 42. By maintaining the axial position of the first end 71 of the non-rising rotating screw 70 relative to electric actuator 42, the non-rising rotating screw 70 is effectively contained within the transmission system 44 while the deheader valve 14 is in an open, closed or throttling position. In such embodiments, the non-rising rotating screw 70 never extends beyond the terminal end 43 of the electric actuator 42.

In addition to fixing the axial relationship between the first end 71 of the non-rising rotating screw 70 and the electric actuator 42, some embodiments of the present invention accomplish translation of a torque load from the electric actuator 42 into the axial displacement of a gate 11, without applying any torque forces to the valve stem 40 or clevis 38. In such preferred embodiments, applying only axial loads to the valve stem allows the blind or gate 11 to move between open, closed and throttling positions without placing any additional strain on any of the constitutive elements of the valve. Preferred embodiments of transmission systems, which allow translation of the torque forces into axial displacement of the blind 11, are illustrated in each of the Figures, particularly FIGS. 5, 6, 7 and 8A-8E and discussed in attendant text.

As illustrated in FIGS. 5, 6, 7 and 8A-8E, various embodiments of a transmission system 44 may utilize a housing assembly 58 to translate the torque forces generated by an electric actuator 42 into axial forces applied to a valve stem 40. In FIG. 5, the transmission system 44 is shown in a closed position. The electric actuator 42 turning the non-rotating screw 70 has been utilized to displace the housing assembly 58 to a first position proximate the deheader valve 10, while FIG. 6 illustrates the housing assembly 58 displaced to a second position near the electric actuator 42.

Displacement of the housing assembly 58 between the first position proximate the valve and the second position proximate an actuator 42 may be accomplished utilizing various structural elements. According to some embodiments, the transmission assembly 44 comprises a housing assembly 58, wherein the housing assembly 58 comprises a threaded internal surface 62. The transmission system may further comprise a rotating screw 70, which in turn may comprise a threaded external surface 68 structured to operably engage the threaded internal surface 62 of the housing assembly 58. As the rotating screw 70 operably engages the threaded internal surface 62 of the housing assembly 58, the housing assembly 58 receives the torque forces generated by the electric actuator 42 and translates the torque forces into the axial displacement of a housing assembly 58. Some embodiments of housing assembly 58 comprise a drive nut 61 with attendant threaded internal surface 62 capable of operably engaging the threaded external surface 68 of a non-rising rotational screw 70. As the non-rising rotational screw 70 is turned, the threaded external surface 68 operably communicates with the threaded internal surface 62 of the drive nut 61, effectively displacing the drive nut 61 axially along the length of the threaded non-rising rotational screw 70.

Housing assembly 58 may also comprise a threaded connection 78, which acts to couple the various constitutive elements of the housing assembly 58 together. As depicted in FIG. 8, threaded connection 78 may be utilized to maintain the drive nut 61 in connection with the threaded external surface 68 of a non-rising rotational screw 70, as well as connect the drive nut 61 to a housing coupling 60. In some embodiments, the housing coupling 60 is bolted to the housing assembly 58 utilizing a lock bolt 80. Lock bolt 80 may effectively act as a means for allowing the drive nut 61 to be adjusted. Accordingly, the torque force exerted by lock bolts 80 and attendant housing coupling 60 on the drive nut 61 results in a tightening of the drive nut 61 around the threaded external surface 68 of the non-rising rotational screw 70, while backing out the lock bolts 80 reduces tension applied to the external surface of the drive nut 61 by the housing coupling 60, effectively decreasing how tightly the drive nut 61 retains the threaded external surface 68 of a non-rising rotational screw 70.

Some embodiments of a housing coupling may further comprise the use of at least one wear block 82. As depicted in FIG. 8, the housing assembly 58 may utilize two wear blocks 82, which may be connected to the housing coupling 60 by the lock bolt 80. According to preferred embodiments, the wear block 82 is designed to extend through a longitudinal groove 49 in a support tower 48, allowing the wear block to be displaced longitudinally along the length of the support tower, but preventing the housing assembly 58 from twisting. In effect, the wear blocks 82 maintain the tortional relationship between the housing assembly 58 and the valve stem 54. As the non-rising rotational screw 70 receives torque forces from the electric actuator 42 and begins to spin, the threaded external surface 68 contacts the threaded internal surface 62 of a drive nut 61. However, because the drive nut 61 is coupled to a wear block 82 via the lock bolt 80, the housing assembly 58 is prevented, effectively by the relationship of the wear block 82 to the longitudinal groove 49, from spinning.

The mechanical interaction between the threaded external surface 68 and the threaded internal surface 62 results in the longitudinal displacement of the housing assembly 58. For example, FIG. 7 depicts the housing assembly 58 longitudinally disposed towards a second position proximate the actuator. As the electric motor is actuated and the non-rising rotational screw 70 rotates in response to receiving tortional forces, the housing assembly 58 moves longitudinally along the length of the support tower 48 to any position along the length of the support tower, and may be shifted to the first position, as depicted in FIG. 8, proximate the valve body. The position of the housing assembly 58 can be represented using a position flag 50. Because the housing assembly 58 is coupled to a valve stem 54, the effect of longitudinally displacing a housing assembly 58 through the support tower 48 results in the longitudinal displacement of the valve stem, which translates this longitudinal force via a clevis 38 to the gate 11, effectively deheading and reheading a deheader valve 14.

As the housing assembly 58 is longitudinally displaced from the first position proximate the valve, to a second position proximate the electric actuator 42, the non-rising rotational screw 70 may slide inside a valve stem recess 56.

Accordingly, the hollow valve stem 54 may comprise a valve stem recess 56 with sufficient length to retain nearly the entire length of the non-rising rotational screw 70. FIG. 7 depicts a non-limiting example of a portion of the non-rising rotational screw 70 retained within the valve stem recess 56 of a hollow valve stem 54. As depicted in the various Figures of the present application, the preferred embodiments of a valve stem recess utilize a smooth surface for allowing the exterior threaded surface 68 of a non-rising rotational screw 70 to move longitudinally inside of the valve stem recess 56 without applying tortional forces to the hollow valve stem.

Additional steps may be utilized to mitigate any tortional forces being applied from the non-rising rotation screw to the valve stem 54. For example, in some embodiments, the housing assembly 58 comprises a retaining ring 59. The retaining ring 59 may be made of a hardened retainer made of one or two piece. As depicted in the various figures of the present invention, and as may be particularly noted in FIG. 8, a valve stem 54 may comprise an external coupling recess 83 for receiving the retaining ring 59 and the housing coupling 60 comprises a complimentary interior coupling recess for receiving the retaining ring 59. Accordingly, the retaining ring 59 may be placed around the exterior of the hollow valve stem 54 in the external coupling recess 83 with the housing assembly 58 binding down on the exterior of the retaining ring 59, forcing the retaining ring 59 to be retained within the external coupling recess 83 of the hollow valve stem 54. In such embodiments, the retaining ring 59 acts then as a linch pin between the housing assembly 58 and the hollow valve stem 54, communicating longitudinal forces while simultaneously preventing any translation of tortional forces from the non-rising rotational screw 70. Accordingly, the retaining ring 59 carries the load of the longitudinal forces when the valve is opening and closing, effectively participating in the translation of rotational forces created by the electric actuator 40 into longitudinal movement of the blind 11 through open, closed and throttling positions.

FIGS. 8A-8E depicts an alternative embodiment of the transmission system 44. As depicted in FIGS. 8A-8E, actuation system 36 comprises an electric actuator 42 and transmission system 44. It is contemplated by the present invention that the electric actuator 42 may be replaced by one of various actuators utilized in the art, including but not limited to hydraulic and pneumatic actuators. Further, as depicted, the actuator may comprise a manual override mechanism 46, which may be utilized to effectively apply longitudinal forces to a valve stem when the actuator 42 fails to function automatically. For example, if an electric actuator 42 were being utilized and a power outage was experienced, the manual override 46 would allow an operator to either close or open a valve 14 by manually rotating the manual override 46.

As depicted in FIG. 8A-8E, the transmission system may comprise a valve stem 54, housing assembly 58 and a support tower 48. The valve stem 54 utilized may either be solid or hollow. In some embodiments, a hollow valve stem 54 may comprise a valve stem recess 56 interior the hollow valve stem 54, effectively retaining the non-rising rotational screw 70 interior the valve stem recess 56. A hollow valve stem 54 may additionally comprise at least one external coupling recess 83 and may alternatively comprise multiple external coupling recesses 83 for mechanically engaging at least one retaining ring 59 and, in some embodiments, multiple retaining rings 59. The at least one retaining ring 59 may also mechanically engage at least one interior coupling recess 84 of a housing coupling 60. Accordingly, as the housing coupling 60 is coupled via a lock bolt 80 to the exterior of the terminal end of a hollow valve stem 54, the at least one retaining ring 59, and in some embodiments multiple retaining rings 59, may engage simultaneously the external coupling recess 83 of a hollow valve stem 54 in the internal coupling recess 84 of a housing coupling, allowing for effective transfer of longitudinal forces to the valve stem 54 from the housing assembly 58, without translating any tortional forces from the housing assembly 58 to the valve stem 54. In this manner, longitudinal forces may be applied to a valve stem 54, which may in turn be connected by a clevis 38 to a gate 11, which may then be moved between open and closed positions to dehead and rehead a deheader valve 14.

The housing assembly 58, depicted in the non-limiting example of FIG. 8, may comprise a housing coupling 60, which may be connected to at least one wear block 82 by a lock bolt 80. In some embodiments, the housing coupling 60 may comprise an interior space capable of receiving most the retaining ring 59 and the drive nut 61. The mechanical relationship between the housing coupling 60, retaining ring 59 and drive nut 61 may be secured utilizing, as depicted, at least one bolt 64 and lock bolt 80. Each of the housing coupling 60 and retaining ring 59 may comprise at least one threaded recess, which may be structured to receive at least one bolt 64 to secure the longitudinal relationship of the housing coupling 60 and drive nut 61. In some embodiments, at least one nut 65 may be utilized to secure the longitudinal relationship of the drive nut 61 to the housing coupling 60, while the lock bolt 80 may be utilized to secure the circumferal pressure applied by the interior of the housing coupling 60 on the drive nut 61.

Support tower 48, as depicted in FIGS. 8A-8E, effectively may be structured to guide the housing assembly 58 in a longitudinal path along the non-rising rotational screw 70, while preventing the housing assembly 58 from twisting as a result of the housing assembly's 58 mechanical relationship with the non-rising rotational screw 70. In some embodiments, the rotational stability created by the support tower 48 is accomplished utilizing a combination of a longitudinal groove 49, and at least one wear block 82. Wear block 82 may extend into the longitudinal groove 49 and may extend exterior the longitudinal groove 49, effectively preventing the housing assembly 58 from rotating. Accordingly, as non-rising rotational screw 70 rotates and applies tortional forces to the threaded internal surface 62 of the drive nut 61 via the threaded external surface 68 of the non-rising rotating screw, the housing assembly 58 is moved longitudinally along the length of the support tower 48 and is prevented from rotating and effectively communicating tortional forces to the valve stem 54 via the relationship between the wear block 82 and longitudinal groove 49, while longitudinal forces are communicated to the valve stem 54 via the relationship of the retaining ring 59, the internal coupling recess 84 of the housing coupling 60, and the retaining ring 59 coupled to the external coupling recess 83 of the hollow valve stem 54.

FIG. 2 illustrates an exemplary operating arrangement in which one of the above-described de-header valves is in use in a delayed coking process. Specifically, FIG. 2 illustrates a coke drum de-heading system 10 showing sliding blind gate-type valve 14 in operation as removably coupled to coke drum 18 or a spool 19. FIG. 2 depicts a sliding blind gate-type valve 14 with valve closure or blind 11 in a partially open position, thus in the process of de-heading coke drum 18. As can be seen, an accumulated coke head 5 exists at the surface of valve closure 11, wherein it has been sheared by the contact seal existing between valve closure 11 and seat support system 23. By shearing coke head 5, coke drum 18 is essentially de-headed and prepared for the decoking process in which the coke 4 within coke drum 18 is purged down through the openings in de-header valve 14 and into a container. Although a sliding blind gate-type de-header valve is depicted in FIGS. 2 and 3, it is emphasized that any of the various types of de-header valves utilized in commerce may be utilized within the coke manufacturing process and to perform the de-heading function of coke drum 18.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes which come within the meaning and range of equivalency of the claims are to be embraced within their scope

What is claimed and desired to be secured by Letters Patent is:

1. A valve actuator for opening and closing a gate of a valve comprising:
   a support tower having at least one longitudinal groove, each longitudinal groove forming opposing internal surfaces;
   a housing assembly having a threaded internal surface and at least one wear block that extends into the at least one longitudinal groove to prevent the housing assembly from rotating, wherein rotation is prevented when the at least one wear block contacts one of the opposing internal surfaces of the at least one longitudinal groove;
   a rotating screw comprising a threaded external surface structured to directly engage the threaded internal surface of the housing assembly to axially displace the housing assembly when the rotating screw rotates, wherein when the housing assembly is axially displaced, the at least one wear block slides axially within the at least one longitudinal groove; and
   a valve stem coupled at a first end to the housing assembly and coupled at a second end to the gate of the valve.

2. The valve actuator of claim 1, wherein the at least one wear block comprises two wear blocks and the at least one longitudinal groove comprises two longitudinal grooves.

3. The valve actuator of claim 1, wherein each of the at least one wear block extends out through the corresponding longitudinal groove.

4. The valve actuator of claim 1, wherein the support tower is configured to be coupled at one end to an actuator and at another end to the valve.

5. The valve actuator of claim 1, further comprising a coupling system between an electric motor and the rotating screw, comprising double key way slots that provide one or more shear points between the electric motor and the rotating screw.

6. The valve actuator of claim 1, wherein the housing assembly comprises two wear blocks structured to connect to the housing assembly by two lock bolts.

7. The valve actuator of claim 1, wherein the support tower further comprises a valve stem recess comprising a smooth interior surface of the valve stem recess, which is structured to allow the exterior threaded surface of the rotating screw to contact the smooth interior surface of the valve stem recess and move longitudinally inside of the valve stem recess without applying torsional forces to the valve stem.

8. The valve actuator of claim 1, wherein each of the at least one wear block is a separate component that is coupled to the housing assembly by a lock bolt.

9. The valve actuator of claim 8, wherein at least one of the lock bolts further comprises a positional flag that extends out through the corresponding longitudinal groove.

10. The valve actuator of claim 8, wherein the housing assembly comprises a housing coupling to which the at least one wear block is connected, the at least one lock bolt securing the housing coupling to a drive nut forming the threaded internal surface.

11. The valve actuator of claim 1, further comprising an electric actuator for providing rotational force to the rotating screw.

12. The valve actuator of claim 11, wherein the actuator further comprises a manual override, allowing for manual torque to be applied to the rotating screw.

13. The valve actuator of claim 11, further comprising a coupling system between the electric actuator and the rotating screw comprising key way slots that provide one or more shear points between the electric motor and rotating screw.

14. The valve actuator of claim 1, wherein the valve actuator is coupled to a coke drum deheader valve via the support tower.

15. The valve actuator of claim 14, wherein the deheader valve further comprises a valve body and a seat system between which the gate slides.

16. The valve actuator of claim 15, wherein said seat system comprises at least one live loaded dynamic seat.

17. The valve actuator of claim 15, wherein the seat system comprises at least one static seat.

18. The valve actuator of claim 1, wherein the threaded internal surface comprises a drive nut.

19. The valve actuator of claim 18, wherein the housing assembly comprises at least one threaded openings for receiving at least one lock bolt, wherein the at least one lock bolt applies an inward radial force to drive nut.

20. The valve actuator of claim 18, wherein one or more lock bolts extend through the wear block to secure the wear block to the housing assembly.

21. The valve actuator of claim 18, the housing assembly further comprising a housing coupling bolted to the housing assembly utilizing a lock bolt, wherein the lock bolt is structured to apply circumferential force, tightening the drive nut around the threaded external surface of the rotating screw, and wherein the lock bolt is structured to reduce circumferential force applied to the external surface of the drive nut, effectively decreasing how tightly the drive nut retains the threaded external surface of the rotating screw when the lock bolt is loosened.

22. The valve actuator of claim 18, further comprising at least one nut structured to secure the longitudinal relationship of the drive nut to a housing coupling, and at least one lock bolt structured to secure the circumferential pressure applied by the interior of the housing coupling on the drive nut.

23. The valve actuator of claim 18, wherein the housing assembly further comprises a retainer ring operably disposed between the housing assembly and the drive nut.

24. The valve actuator of claim 23, wherein the retainer ring is comprised of one of a ring or two semi circle rings.

25. The valve actuator of claim 23, wherein the housing assembly comprises one or more threaded openings for receiving one or more lock bolts, wherein the one or more lock bolts apply an inward radial force to at least one of the one or more retaining rings.

26. The valve actuator of claim 23, wherein the retainer ring is structured to couple to the valve stem.

27. The valve actuator of claim 26, wherein the retainer ring is structured to prevent torque on the valve stem.

28. The valve actuator of claim 23, wherein the valve stem comprises an external recess for receiving the retaining ring; and a housing coupling comprises a complimentary interior coupling recess for receiving the retaining ring.

29. The valve actuator of claim 28, wherein the retaining ring is lodged between the external coupling recess of the valve stem and the interior coupling recess of the housing coupling, with the housing assembly binding down on the exterior of the retaining ring, forcing the retaining ring to be retained within the external coupling recess of the valve stem, wherein the retaining ring is structured to communicate longitudinal forces between the housing assembly and the valve stem, while simultaneously preventing translation of torsional forces from the rotating screw to the valve stem.

30. The valve actuator of claim 29, wherein the valve stem comprises multiple external coupling recesses for mechanically engaging multiple retaining rings.

31. A valve actuator for opening and closing a gate of a valve, the valve actuator comprising:
   a support tower having a first and a second end, the first end being configured to be connected to a motor, the support tower comprising one or more longitudinal grooves comprising openings with opposing internal surfaces that extend between the first and second ends;
   a rotating screw comprising a threaded external surface, the rotating screw structured to rotate within the support tower when a rotational force is applied by the motor;
   a housing assembly comprising a drive nut and a wear block, the drive nut comprising a threaded internal surface in direct physical contact with the threaded external surface of the rotating screw that allows the drive nut to travel longitudinally along the rotating screw when the rotating screw rotates, the wear block extending into the one or more longitudinal grooves in the support tower thereby preventing the housing assembly from rotating when the rotating screw is rotated, wherein rotation is prevented when the at least one wear block contacts one of the opposing internal surfaces of the at least one longitudinal groove; and
   a valve stem coupled to the drive nut such that the valve stem travels longitudinally with the drive nut, the valve stem comprising a valve stem recess comprising a hollow interior portion of the valve stem, structured to allow the valve stem to travel longitudinally towards the first end of the support tower, while the rotating screw inserts further into the valve stem recess.

32. The valve actuator of claim 31, wherein the valve stem is coupled to the drive nut via a housing coupling.

33. The valve actuator of claim 32, wherein the valve stem and the housing coupling include one or more corresponding coupling recesses into which one or more retaining rings extend.

34. The valve actuator of claim 32, wherein the housing coupling is coupled to the valve stem via a lock bolt.

35. The valve actuator of claim 34, wherein the lock bolt secures the wear block to the housing coupling.

36. The valve actuator of claim 32, wherein the drive nut is coupled to the housing coupling via a plurality of bolts.

37. The valve actuator of claim 31, wherein the housing assembly comprises one or more threaded openings for receiving one or more lock bolts, wherein the one or more lock bolts apply a inward radial force to the drive nut.

38. The valve actuator of claim 33, wherein the housing coupling includes one or more threaded openings for receiving one or more lock bolts, wherein the one or more lock bolts apply a inward radial force to at least one of the one or more retaining rings.

39. A valve actuator for opening and closing a gate of a valve, the valve actuator comprising:
   a support tower having a first and a second end, the first end being configured to be connected to a motor, the support tower including comprising one or more longitudinal grooves comprising openings with opposing internal surfaces that extend between the first and second ends;
   a rotating screw comprising a threaded external surface, the rotating screw being configured to rotate within the support tower when a rotational force is applied by the motor;
   a housing assembly comprising a drive nut, a housing coupling secured to the drive nut, and a wear block secured to the housing coupling, the drive nut comprising a threaded internal surface structured to allow the housing assembly to travel longitudinally along the rotating screw when the rotating screw rotates, the wear block extending into the one or more longitudinal grooves in the support tower thereby preventing the housing assembly from rotating when the rotating screw is rotated wherein rotation is prevented when the at least one wear block contacts one of the opposing internal surfaces of the at least one longitudinal groove; and
   a valve stem coupled to the housing assembly such that the valve stem travels longitudinally with the housing assembly, the valve stem comprising a valve stem recess comprising a hollowed out interior portion of the valve stem, wherein the valve stem is coupled to the housing assembly via one or more retaining rings that extend into one or more corresponding coupling recesses formed in the exterior surface of the valve stem and the interior surface of the housing coupling, wherein the housing coupling includes one or more threaded openings for receiving one or more lock bolts, wherein the one or more lock bolts apply an inward radial force to at least one of the one or more retaining rings, wherein as the valve stem travels axially towards the first end of the support tower, the rotating screw inserts further into the valve stem recess.

40. The valve actuator of claim 39, further comprising:
   a positional flag attached to a portion of the wear block that extends out through one of the one or more openings, the position flag providing a visual indication of the position of the housing assembly within the support tower.

41. A valve actuator for opening and closing a gate of a valve, the valve actuator comprising:
   a support tower having a first and a second end, the first end being configured to be connected to a motor, the support tower including one or more longitudinal grooves comprising openings that extend between the first and second ends;
   a rotating screw having a threaded external surface, the rotating screw being configured to rotate within the support tower when a rotational force is applied by the motor;
   a housing assembly comprising a drive nut, a housing coupling secured to the drive nut, and a wear block secured to the housing coupling, wherein the housing coupling includes one or more threaded openings for receiving one or more lock bolts, wherein the one or more lock bolts extend through the wear block to secure the wear block to the housing coupling and the one or more lock bolts apply a inward radial force to at least one of the one or more retaining rings, the drive nut having a threaded internal surface that causes the housing assembly to travel axially along the rotating screw when the rotating screw rotates, the wear block extending through the one or more openings in the support tower thereby preventing the housing assembly from rotating when the rotating screw is rotated; and a valve stem coupled to the housing assembly such that the valve stem travels axially with the housing assembly, the valve stem including a valve stem recess comprising a hollowed out interior portion of the valve stem, wherein the valve stem is coupled to the housing assembly via one or more retaining rings that extend into one or more corresponding coupling recesses formed in the exterior surface of the valve stem and the interior surface of the housing coupling, wherein as the valve stem travels axially towards the first end of the support tower, the rotating screw inserts further into the valve stem recess.

42. The valve actuator of claim 41, further comprising one or more key way slots that provide one or more shear points.

43. The valve actuator of claim 41, wherein the valve actuator is coupled to a coke drum deheader valve via the support tower.

44. The valve actuator of claim 41, wherein the deheader valve further comprises a valve body and a seat system between which the gate slides.

45. The valve actuator of claim 41, wherein said seat system comprises at least one live loaded dynamic seat.

46. The valve actuator of claim 41, wherein the seat system comprises at least one static seat.

* * * * *